United States Patent [19]

Nakanowatari et al.

[11] Patent Number: 5,105,185

[45] Date of Patent: Apr. 14, 1992

[54] DISPLAY METHOD, DEVICE FOR REALIZING SAME AND DISPLAYING MEDIUM USED THEREFOR

[75] Inventors: Jun Nakanowatari, Miyagi; Makoto Tomoyori, Iwate; Kazuyoshi Sasaki, Morioka, all of Japan

[73] Assignee: Alps Electric Co., Ltd., Tokyo, Japan

[21] Appl. No.: 551,701

[22] Filed: Jul. 11, 1990

[30] Foreign Application Priority Data

Jul. 12, 1989 [JP] Japan .................................. 1-179769

[51] Int. Cl.⁵ ............................................. G09G 3/36
[52] U.S. Cl. .................................... 340/784; 340/765; 359/51; 359/52
[58] Field of Search ................ 350/331 R, 342, 347 E; 340/765, 784; 355/210, 211; 430/19, 20, 31, 46, 56, 138

[56] References Cited

U.S. PATENT DOCUMENTS

| | | | |
|---|---|---|---|
| 3,732,119 | 5/1973 | Churchill et al. | 283/91 |
| 3,764,211 | 10/1973 | Morse et al. | 350/342 |
| 3,795,517 | 3/1974 | Sutton | 350/342 |
| 4,603,945 | 8/1986 | Fergason | 350/331 R |
| 4,971,719 | 11/1990 | Vaz et al. | 350/331 R |
| 4,981,340 | 1/1991 | Kurematsu et al. | 340/784 |

FOREIGN PATENT DOCUMENTS

| | | |
|---|---|---|
| WO85/04022 | 3/1987 | European Pat. Off. |
| 62-288428 | 11/1987 | Japan . |
| 1581575 | 5/1976 | United Kingdom . |
| 2172606A | 3/1986 | United Kingdom . |

OTHER PUBLICATIONS

Xerox Disclosure Journal. Liquid Crystal Display with Power Amplification by Benjamin Kazan, 11/4/80.

Primary Examiner—Jeffery A. Brier
Assistant Examiner—Jick Chin
Attorney, Agent, or Firm—Guy W. Shoup; David W. Heid

[57] ABSTRACT

The present invention relates to a method and a device for displaying letters, images, etc. as well as a displaying medium used therefor, by which a display medium obtained by superposing a photoconductive layer, in which microcapsules are dispersed on a substrate. The microcapsules enclose a liquid crystal material which transitions between a transparent state and an opaque state by the application of an electric field. The substrate has a conductive surface so that charging of the surface causes the microcapsules to become transparent. An electrostatic latent image is formed on the surface of the displaying medium by irradiating selectively the surface with light. An AC electric field is applied to the displaying medium in order to make the microcapsules opaque at the position corresponding to the place, where the electric field is made disappear thereby making the latent image visible.

8 Claims, 3 Drawing Sheets

DISPLAY METHOD, DEVICE FOR REALIZING SAME AND DISPLAYING MEDIUM USED THEREFOR

BACKGROUND OF THE INVENTION

1. Field of the Invention

The present invention relates to a display method and a display device for displaying letters, images, etc. as well as a displaying medium used therefor.

2. Description of the Prior Art

Recently, the need for displaying large capacity information including letters, images, etc. (hereinbelow called "image" all together) all at one time has increased with the development of the electronic file, etc. A display device is required which is capable of verifying an edited image or displaying design drawings at one time. The image may be edited e.g. by means and a word processor before outputting the image as a hard copy and the drawings may include graphics as a whole.

Heretofore a CRT, a liquid crystal display, etc. are devices used for such a display. However for the CRT it is not possible to extensively increase the size the image itself in view of the structure and the cost thereof. Since the resolving power of the CRT is restricted by the number of scanning lines, it is not possible to obtain a display having a satisfactorily high resolution. For this reason the CRT has a drawback that in the case where letters or images are fine, it is not possible to display them with a high quality. On the other hand, the liquid crystal display has an advantage that it is possible to reduce the thickness, the whole size and the weight with respect to the CRT. In contrast, it is difficult to fabricate a large enough liquid crystal display panel relative to the CRT with a high fabrication yield. Moreover, the resolving power of the liquid crystal display is not improved relative to the CRT.

On the other hand, a display device has been proposed, by which endless belt type photosensitive paper is used as a recording medium, on which a toner image is formed by using the electronic photographic process, and this recording medium is viewed by the eye through a glass plate while moving it through a display section. Since the recording medium has a belt shape, it is possible for this system to obtain a large size image in a simple manner only by enlarging the belt. Further, since it is so constructed that the image, which is to be displayed, is written-in by using light such as laser, etc. and visualized by using toner, it is possible to form easily a display image of high resolution. Therefore this system is expected as means capable of fulfilling the requirements described above.

However the display device of this system has following drawbacks. That is, since toner is used for forming images, a developing device for supplying toner to the recording medium and a mechanism for removing toner from the recording medium are necessary. Therefore the device has a problem that the size thereof is increased as the whole and the mechanism is complicated. Further, since the image display is repeatedly effected, toner images are successively formed and it is repeated to locate these toner images at the place opposite to the glass plate in the displaying section. For this reason it has a problem that toner scattered within the device in the course of use is attached on the inner surface of the glass plate, which is gradually coated with toner. Therefore, it is impossible to keep a good display state for a long period of time.

SUMMARY OF THE INVENTION

The present invention has been done in view of the problematical points described above and an object thereof is to provide a new display method and a device for realizing the same. The invention is capable of displaying information of large capacity all at once and with a high resolving power. Another object of the present invention is to provide a display device capable of displaying always an image of high quality, even if it is repeatedly used, and keeping a good display state for a long period of time. Still another object of the present invention is to provide a display device, for which neither a developing device nor developer, such as toner, is required, the image display can be performed repeatedly with an inexpensive construction, and it is easy to obtain a large scale display image. Still another object of the present invention is to provide a new displaying medium capable of forming visual images without any developer such as toner etc.

According to the objects of the present invention a display method, is provided wherein an electric field is formed in a displaying medium. The display medium is obtained by superposing a photoconductive layer in which microcapsules, are dispersed on a substrate. The microcapsules enclose liquid crystal material. The substrate is conductive at least at a surface portion thereof order to make the microcapsules in transparent. A latent image is formed by making the electric field disappear. An AC electric field is applied to the displaying medium, in which the latent image is formed, in order to make the microcapsules opaque. When the electric field is made to disappear, the liquid crystal microcapsules form a visible latent image.

Moreover, a display device is provided comprising a displaying medium obtained by superposing a photoconductive layer, in which microcapsules, are dispersed, on a substrate which is conductive at least at the surface portion thereof The microcapsules enclose liquid crystal material. The display device also comprises means for forming an electric field in the displaying medium; latent image forming means for forming a latent image by making the electric field selectively disappear; and electric field applying means for applying AC voltage to the display medium, in which the latent image is formed.

A displaying medium, is provided which is obtained by superposing a photoconductive layer, in which microcapsules, are dispersed on a substrate which is conductive at least at the surface portion thereof. The microcapsules enclose a liquid crystal material.

According to the present invention as described above, the displaying medium is so constructed that a layer, whose conductivity varies by being irradiated with light, is superposed on a substrate. Microcapsules enclosing a liquid crystal material are dispersed in the layer. The liquid crystal material has a transparent state and a opaque state. The states vary depending on applied electric field, and the liquid crystal can hold each of the states The formation of the image to be displayed, is effected as follows. At first, the microcapsules described above become transparent due to the electric field produced by charging the surface portion of the displaying medium, etc. Therefore a latent image is formed by making this electric field selectively disappear. Further the microcapsules described above are changed to the opaque state at the position corresponding to the place, where the latent image is formed, by applying AC voltage thereto, in order to form a visual image. i.e. a displayed image.

DETAILED DESCRIPTION OF THE PREFERRED EMBODIMENTS

Figure 1:
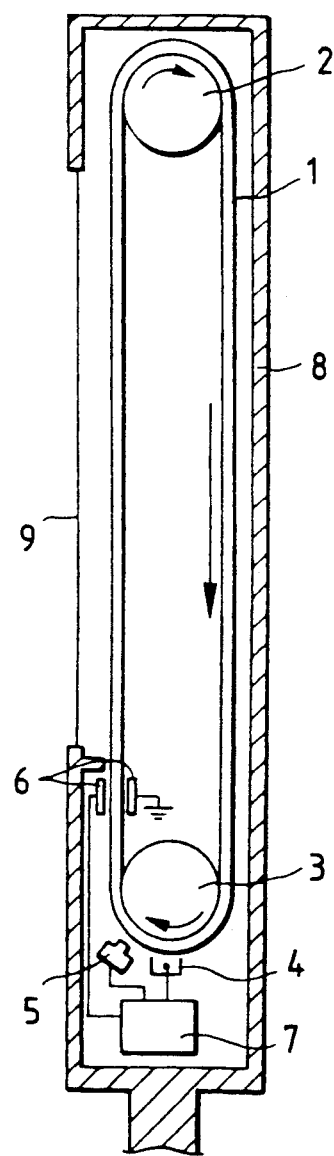
FIG. 1 is a scheme for explaining the construction of the display device, which is an embodiment of the present invention.

Hereinbelow the present invention will be explained in detail, referring to the drawings.

FIG. 1 shows an embodiment of the display device according to the present invention. In the figure, reference numeral 1 represents displaying medium formed in an endless belt shape, which is bridged between a pair of rollers 2 and 3 located at the upper and the lower portion, respectively. The displaying medium 1 is so constructed, as described later, that a photoconductive layer is superposed on a substrate and microcapsules, in which liquid crystal material is enclosed, are dispersed uniformly the therein. At a position, which is opposite to the roller 3, there is disposed charging means 4 consisting of a corona charging device for charging the surface of the displaying medium 1 to form electric field, a charging brush, a charging roller, etc. On the downstream side in the forwarding direction of the displaying medium there is disposed light writing means 5 for forming an image to be displayed on the surface of the displaying medium 1, in which the electric field is produced by the charge, in the form of an electrostatic latent image. Means, which can irradiate the surface of the displaying medium 1 with a small spot on the basis of inputted image data, is used as this light writing means such as an LED array, a semiconductor laser, a liquid crystal shutter, etc. 6 represents a pair of electrodes, which are located further on the downstream side of the light writing means 5, for applying the AC electric field on the displaying medium, in which the electrostatic latent image is formed. 7 is a recording control section, with which the charging means 4, the light writing means and the electrodes are connected and which controls the operation of each of these units according to a procedure described later to form the image to be displayed on the displaying medium 1 on the basis of the image data sent from a host computer, etc. not shown in the figure. The formed image is displayed by a display section 9 formed in the front of the main body 8 of the device, consisting of a transparent plate made of glass, plastic, etc.

Figure 2:
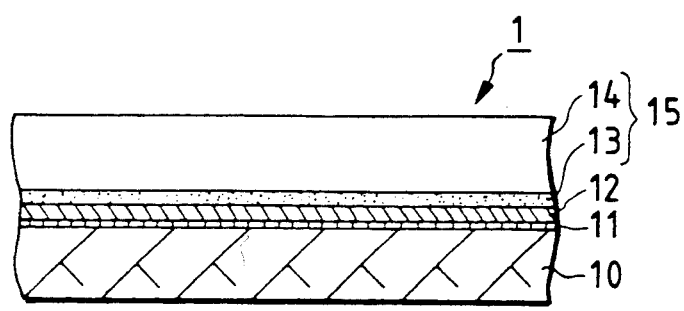
FIGS. 2 and 3 are schemes for explaining the displaying medium according to the present invention.
Figure 3:
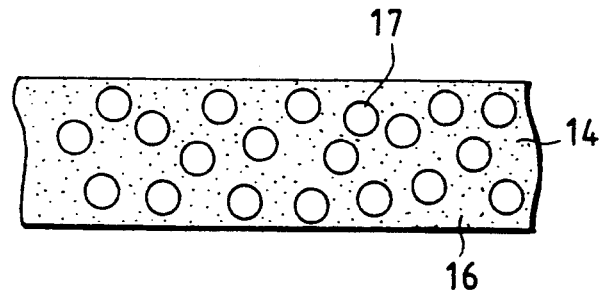

Now the construction of the displaying medium according to the present invention will be explained. FIG. 2 shows an embodiment of the displaying medium used for the display device according to the present invention. In the figure, 10 is a substrate made of plastic resin such as polyethylene phthalate, polyethylene, polypropylene, etc., on which a conductive layer 11 made of ITO (indium oxide), aluminum, etc. is deposited. 12 is an underlayer made of PVP (polyvinyl pyrrolidone), etc., which is disposed on this conductive layer 11, and a photoconductive layer 15 made of a photoconductive material is superposed further thereon. In the present embodiment the photo conductive layer 15 consists of two layers, a charge generating layer (CGL) 13 made of an organic photoconductive material and generating carriers by irradiation with light and a charge transporting layer (CTL) 14. This charge transporting layer 14 is so constructed that microcapsules, 17, in which liquid crystal material is enclosed, are dispersed uniformly in a charge transporting material 16, as indicated in FIG. 3. The microcapsules 17 used here are formed by microcapsulizing the liquid crystal material by the core salvation method, the interface polymerization method, etc. Liquid crystal materials, such as nematic liquid crystal, ferroelectric liquid crystal, etc. are typically used. The liquid crystal material used for realizing the present invention has phase transitions between a transparent state, in which light is transmitted, and an opaque (scattering) state, in which light is scattered. These phase transitions take place by applying an electric field having a specified voltage and a specified frequency to the microcapsules. These states are memorized until the next specified electric field is applied thereto. Further, taking the response speed into account, it is particularly desirable to use ferroelectric liquid crystal.

The size of the microcapsules used for realizing the present invention can be selected arbitrarily, depending on the balance to the layer thickness of the photoconductive layer containing them. However, taking the resolution of the displayed image into account, it is preferable to select it between 2 and 30 $\mu$m.

Figure 4A:
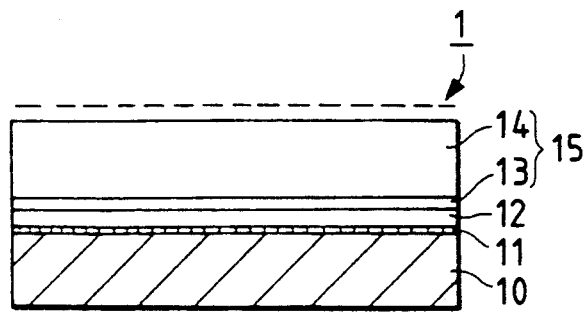
FIGS. 4(a)-4(d) are schemes showing the procedure for forming the displayed image according to the present invention.
Figure 4B:
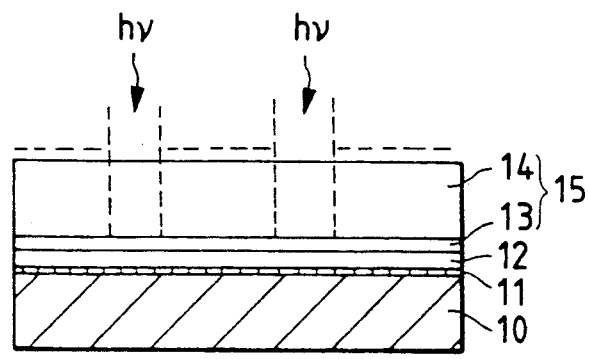
Figure 4C:
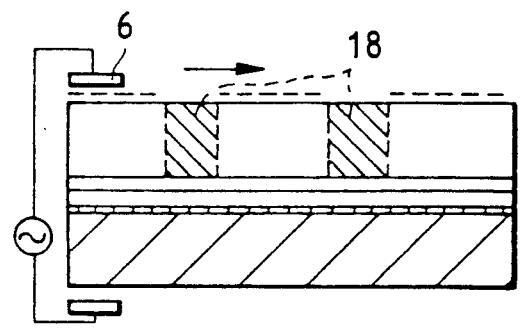
Figure 4D:
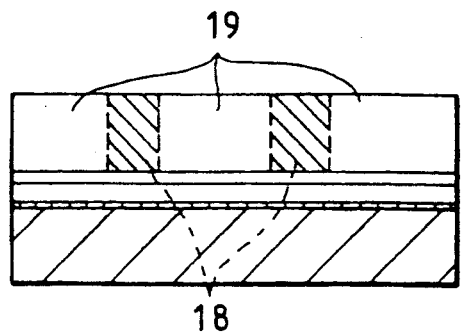

Next the display method according to the present invention will be explained on the basis of the principle, taking the case, where the displaying medium having the construction indicated in FIG. 2 is used, as an example. FIGS. 4(a)-4(d) show the procedure for forming the displayed image. At first, when this image to be displayed is formed, as indicated in FIG. 4(a) the surface of the displaying medium 1 is charged uniformly by the charging means. The electric field produced by this charging gives rise to phase transition in the whole liquid crystal material in the charge transporting layer 14 and the microcapsules transition to the transparent state, where light is transmitted. Next the write-in of the image to be displayed is effected by irradiating the surface of the charged displaying medium 1-selectively with light, as indicated by in the FIG. 4(b), by means of the light writing means. By this operation electric charge on the surface disappears at the place irradiated with light by the fact that charge carriers are generated in the charge generating layer 13. In this way, as indicated in FIG. 4(b), the image to be displayed is formed in the form of an electrostatic latent image. At this time, the liquid crystal material on the part corresponding to the place, here the charge has disappeared, is in the state corresponding to where no electric field is applied thereto. However, since the transparent state is memorized, all the microcapsules are held in the transparent state as they are. Thereafter the displaying medium 1, in which the electrostatic latent image is formed, is moved to the place of the pair of electrodes 6, where the AC electric field is applied thereto as shown in FIG. 4(c). The applied AC electric field is different, depending on the liquid crystal material used. For example, an AC voltage of 10 to 100 V having a frequency of 200 to 500 Hz is used. By the application of this AC electric field, the liquid crystal at the part corresponding to the place where there is no electric charge is subjected to a great variation in the electric field, which gives rise to the phase transition. In this way, the microcapsules in this region 18 are changed from the transparent state to the opaque sate, as indicated in FIG. 4(c). On the other hand, since the part corresponding to the place where the charge remains on the surface is almost not influenced by this AC electric field, the transparent state established before is held as it is. Consequently, the image to be displayed is visualized by contrast between the color of the microcapsules, which have transitioned to the opaque state, i.e. the color of the liquid crystal material and the color of the charge generating layer viewed through the microcapsules, which have become in the transparent state. The displaying medium 1, in which the image to be displayed has been formed in this way, is moved to the display section to be displayed there. At this time, the displaying medium 1 is irradiated with white light and, in this way, all the electric charge remaining on the surface disappears. However, since the region 19 in the transparent state is held as it is, owing to the memorizing property which the liquid crystal material has and after the charge has disappeared, the image to be displayed is held in the stable state, as it is, as indicated in FIG. 4(d).

The erasing of the image to be displayed, which has been once formed, is effected by uniformly charging the displaying medium 1. That is, the liquid crystal material, which has transitioned to the opaque state up to this time, is subjected to the phase transition owing, to the electric field produced by this charge. Therefore all the liquid crystal is changed to the transparent state. For this reason, all the microcapsules transition to the transparent state and the contrast, which has formed the image up to this time, disappears.

In this way, by the display method according to the present invention it is possible to form repeatedly the image to be displayed by effecting successively the operations of the charging, the writing by light, the application of the AC electric field and the display.

Since the displaying medium according to the present invention forms the contrast to effect the image display by utilizing the transparent state and the opaque state, it is possible to form various contrasts, depending on the color of the charge generating layer acting as the background for the liquid crystal material, i.e. the microcapsules, when they are transparent. When the liquid crystal material is in the opaque state, it scatters light and seems to be white. On the contrary, when organic photoconductive materials such as phtalocyanines, azo pigments, squarics and azuleniums are used for the charge generating layer, it is possible to form a blue or green background. Apart from these organic materials, inorganic photoconductive materials such as Se, CdS, amorphous silicon, etc. may be used for the charge generating layer according to the present invention. By using such an inorganic material, it is possible to form a background having a color different from that obtained in the case where the organic material is used. At this time, it is possible to form a good display image by matching the wavelength of the light, with which the charge generating layer is irradiated by the light writing means, with the photosensitive wavelength region of the material used therefor.

The charging voltage by the display method according to the present invention varies, depending on the material for the photoconductive layer. However, it is desirable that the absolute value thereof is comprised of between 300 V and 600 V. Further, it is desirable that the frequency of the applied AC electric field is higher than 100 Hz, and more preferably 300 Hz, because no phase transition takes place in the liquid crystal material, if it is too low.

Hereinbelow several concrete embodiments will be shown.

EMBODIMENT 1

A conductive layer made of ITO (indium oxide) and an underlayer made of PVP (polyvinyl pyrrolidone) were formed in this order on a belt made of polyethylene phtalate having a thickness of 75 μm. An organic photoconductive layer 20 μm thick consisting of the charge generating layer and the charge transporting layer as the photoconductive layer was formed further thereon, to fabricate the image displaying medium. In this case an organic photoconductive material of azo pigments was used for the charge generating layer. The formation of the charge transporting layer was effected as follows. At first, microcapsules of 5 μm were formed by the core salvation method by using ferroelectric CS-10110 (trade mark, fabricated by Chisso Co., Ltd.) for the liquid crystal material. Next hydrazone was dispersed in a binder made of polycarbonate to prepare the charge transporting material, in which the microcapsules were further dispersed. The displaying medium was formed by applying it on the charge generating layer. The displaying medium thus prepared was set in an apparatus having the construction indicated in FIG. 1 and an image to be displayed was formed. A coroa charging device was used for charging the surface and an LED array for the writing-in by light. The image to be displayed was formed under the condition that the charging voltage was −300 V; the wavelength of the light emitted by LED was 740 nm; the voltage of the applied AC electric field was 50 V; and the frequency was 300 Hz. In this way, a good image having a contrast greater than 100 and a resolution greater than 300DPI could be displayed. Further it was possible to keep this image for a long time as it was.

EMBODIMENT 2

An image displaying medium was prepared in the same way as that described in EMBODIMENT 1, except that ferroelectric liquid crystal CS-1010 (trade mark, fabricated by Chisso Co., Ltd.) was used for the liquid crystal material. The displayed image thus formed was good in the contrast, the resolution and the preservation.

EMBODIMENT 3

An image displaying medium was prepared in the same way as that described in EMBODIMENT 1, except that palladium was used for the conductive layer and amorphous selenium was used for the charge generating layer. This image displaying medium is set in an apparatus similar to that used in EMBODIMENT 1 and the formation of a displayed image was carried out. However a laser having a wavelength of emitted light of 580 nm was used for the writing-in by light. Also in this case the displayed image thus formed was good in the contrast, the resolution and the preservation.

EMBODIMENT 4

Displayed images were formed under a condition similar to that described in EMBODIMENT 1 by using the displaying medium in EMBODIMENT 1, except that the charging voltage was varied stepwise with an interval of 50 V from −350 V to −600 V. All the images thus formed were good both in the image quality and in the preservation.

EMBODIMENT 5

Displayed images were formed under a condition similar to that described in EMBODIMENT 1, by using the displaying medium in EMBODIMENT 1, except that the frequency of the applied AC electric field was varied stepwise with an interval of 50 Hz from 350 Hz to 500 Hz. All the images thus formed were good both in the image quality and in the preservation.

Furthermore, the present invention is not restricted to these embodiments described above, but various modifications are possible at needs.

As explained above in detail, according to the present invention, it is possible to display large capacity information all at once with a high resolution. Further, since no developer such as toner, etc. is necessary for the formation of the displayed image, the display device can be cheap and at the same time hold the state of the display of high quality for a long time, even if it is used repeatedly. Furthermore, since the displaying medium can be formed in a belt shape, another effect can be obtained that it is possible to increase easily the size of the displayed image, while holding the high resolving power.

What is claimed is:

1. A method for displaying images comprising the steps of:
   forming an electric field in a displaying medium, wherein said displaying medium is obtained by superposing a photoconductive layer on a substrate, said photoconductive layer dispersing microcapsules, said microcapsules enclosing a liquid crystal material, said substrate being conductive at least at a surface portion thereof, said electric field for making said liquid crystal material transparent; and
   forming a latent image by making said electric field selectively disappear and by applying an AC electric field selectively to where said electric field has disappeared, said AC electric field for making said liquid crystal material opaque and said latent image visible.

2. The method according to claim 1, wherein said step of forming said electric field in said displaying medium is effected by charging said surface of said displaying medium.

3. The method according to claim 2, wherein said step of forming said latent image is effected by irradiating selectively the surface of said displaying medium with light.

4. A display device comprising:
   a displaying medium comprising photoconductive layers, microcapsules dispersed in said photoconductive layers, said microcapsules enclosing a liquid crystal material, and a substrate which is conductive at least at a surface portion thereof, said photoconductive layers being superposed on said substrate;
   means for forming a uniform electric field in said displaying medium;
   latent image forming means for forming a latent image by making said electric field selectively disappear; and
   electric field applying means for applying a uniform AC electric field to said displaying medium in which said latent image is formed and for forming a display image from said latent image.

5. A display device according to claim 4, wherein said electric field forming means is a charging device for uniformly charging the surface of said displaying medium.

6. A display device according to claim 5, wherein said latent image forming means is a light writing device for irradiating the surface of said displaying medium with light.

7. A display medium comprising:
   a substrate which is conductive at least at a surface portion thereof;
   a photoconductive layer formed on said substrate and comprising a charge generating layer and a charge transporting layer; and
   microcapsules containing a liquid crystal material and being dispersed in said charge transporting layer.

8. A display medium according to claim 7, wherein said liquid crystal material is a ferroelectric liquid crystal.

* * * * *